(12) United States Patent
Bertizzolo et al.

(10) Patent No.: US 12,408,042 B2
(45) Date of Patent: Sep. 2, 2025

(54) METHOD FOR SPECTRUM SHARING BY PRIMARY AND SECONDARY NETWORKS BASED ON COGNITIVE BEAMFORMING

(71) Applicant: Northeastern University, Boston, MA (US)

(72) Inventors: Lorenzo Bertizzolo, Boston, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 580 days.

(21) Appl. No.: 17/431,752

(22) PCT Filed: Feb. 27, 2020

(86) PCT No.: PCT/US2020/020027
§ 371 (c)(1),
(2) Date: Aug. 18, 2021

(87) PCT Pub. No.: WO2020/176704
PCT Pub. Date: Sep. 3, 2020

(65) Prior Publication Data
US 2022/0116789 A1   Apr. 14, 2022

Related U.S. Application Data

(60) Provisional application No. 62/811,254, filed on Feb. 27, 2019.

(51) Int. Cl.
*H04W 16/14* (2009.01)
*H04B 7/0456* (2017.01)
*H04B 7/06* (2006.01)

(52) U.S. Cl.
CPC ......... *H04W 16/14* (2013.01); *H04B 7/0456* (2013.01); *H04B 7/0617* (2013.01); *H04B 7/0626* (2013.01); *H04B 7/0689* (2013.01)

(58) Field of Classification Search
USPC ........................................... 370/329
See application file for complete search history.

(56) References Cited

U.S. PATENT DOCUMENTS

| | | | |
|---|---|---|---|
| 2007/0105587 A1* | 5/2007 | Lu | H04B 1/406 455/552.1 |
| 2007/0133586 A1* | 6/2007 | Ojard | H04L 25/03343 714/E11.207 |

(Continued)

OTHER PUBLICATIONS

Khawer et al., "usICIC—A Proactive Small Cell Interference Mitigation Strategy for Improving Spectral Efficiency of LTE Networks in the Unlicensed Spectrum," IEEE Trans. Wireless Communications, vol. 15, No. 3, pp. 2303-2311, Mar. 2016.

(Continued)

*Primary Examiner* — Gregory B Sefcheck
*Assistant Examiner* — Majid Esmaeilian
(74) *Attorney, Agent, or Firm* — Verrill Dana, LLP

(57) ABSTRACT

Method and systems of sharing a frequency spectrum between a primary wireless network and a secondary wireless network coexisting with the primary wireless network are provided. At a node of the secondary network, at a bottom of a protocol stack integrated between a plurality of antennas and upper layers of the protocol stack, a beamforming scheme is determined for transmission to scheduled users of the secondary network. Using this technology, a newly-deployed wireless network can access a spectrum band based on cognitive beamforming without mutual temporal exclusion. i.e., without interrupting the ongoing transmissions of coexisting wireless networks on the same bands, and without cross-technology communication.

17 Claims, 12 Drawing Sheets

(56) References Cited

U.S. PATENT DOCUMENTS

| | | | | |
|---|---|---|---|---|
| 2010/0309781 | A1* | 12/2010 | Wang | H04B 7/0871 375/267 |
| 2013/0322279 | A1* | 12/2013 | Chincholi | H04L 43/106 370/252 |
| 2014/0086086 | A1* | 3/2014 | Zhang | H04B 7/0452 370/252 |
| 2014/0093005 | A1* | 4/2014 | Xia | H04B 7/0617 375/267 |
| 2015/0110046 | A1* | 4/2015 | Merlin | H04B 7/0452 370/329 |
| 2015/0333884 | A1* | 11/2015 | Athley | H04W 16/28 375/295 |
| 2016/0359533 | A1* | 12/2016 | Obara | H04B 7/0408 |
| 2017/0093506 | A1* | 3/2017 | Miao | H04B 17/21 |
| 2017/0338876 | A1* | 11/2017 | Moosavi | H04B 7/0456 |
| 2018/0034612 | A1* | 2/2018 | Lin | H04L 25/0224 |
| 2018/0284217 | A1* | 10/2018 | Takeuchi | H04W 16/28 |
| 2019/0132031 | A1* | 5/2019 | Park | H04B 7/0626 |
| 2019/0166563 | A1* | 5/2019 | Ansari | H04B 7/0617 |
| 2019/0199379 | A1* | 6/2019 | Österling | H04B 7/0617 |
| 2019/0393945 | A1* | 12/2019 | Cavalcante | H03M 7/30 |
| 2020/0186991 | A1* | 6/2020 | He | H04L 5/0094 |

OTHER PUBLICATIONS

Kosek-Szott et al., "Coexistence Issues in Future WiFi Networks," IEEE Network, vol. 31, No. 4, pp. 86-95, Jul. 2017.

Zinno et al., "On a Fair Coexistence of LTE and Wi-Fi in The Unlicensed Spectrum: A Survey," Computer Communications (Elsevier), vol. 115, pp. 35-50, Jan. 2018.

Bajracharya et al., "LTE in the Unlicensed Spectrum: A Survey," IETE Technical Review, vol. 35, No. 1, pp. 78-90, Jan. 2018.

Qualcomm, "Spectrum for 4G and 5G (White Paper)." Qualcomm Technologies, Inc., 20 pages, Dec. 2020. Available: www.qualcomm.com/media/documents/files/spectrum-for-4g-and-5g.pdf.

Geraci et al., "Operating Massive MIMO in Unlicensed Bands for Enhanced Coexistence and Spatial Reuse," IEEE J. Sel. Areas in Commun. (JSAC), vol. 35, No. 6, pp. 1282-1293, Jun. 2017.

Garcia-Rodriguez et al., "Massive MIMO Unlicensed: A New Approach to Dynamic Spectrum Access," IEEE Communications Magazine, vol. 56, No. 6, pp. 186-192, Jun. 2018.

Lo, Titus K.Y., "Maximum Ratio Transmission," IEEE Transactions on Communications, vol. 47, No. 10, pp. 1310-1314, Oct. 1999.

Spencer et al., "Zero-forcing methods for downlink spatial multiplexing in multiuser MIMO channels," IEEE Trans. Signal Process, vol. 52, No. 2, pp. 461-471, Feb. 2004.

Parfait et al., "Performance Analysis and Comparison of ZF and MRT Based Downlink Massive MIMO Systems," Proc. of Intl. Conference on Ubiquitous and Future Networks (ICUFN), Shanghai, China, pp. 383-388, Jul. 2014.

Guan et al., "CU-LTE: Spectrally-Efficient and Fair Co-existence Between LTE and Wi-Fi in Unlicensed Bands," Proc. of IEEE Intl. Conference on Computer Communications (INFOCOM), San Francisco, CA, USA, Apr. 2016, 9 pages.

Bayhan et al., "Coexistence gaps in space: Cross-technology Interference-nulling for improving LTE-U/WiFi Coexistence," Oct. 2017, 11 pages. Available: arxiv.org/abs/1710.07927.

Zubow et al., "XZero: On Practical Cross-Technology Interference-Nulling for LTE-U/WiFi Coexistence," arXiv:1801.07992v1 [cs.NI], Jan. 24, 2018, 9 pages.

Li et al., "Spectrum Sharing Across Multiple Service Providers via Cognitive Radio Nodes," IET communications, vol. 4, No. 5, pp. 551-561, Mar. 2010.

* cited by examiner

*Continued Continued*

METHOD FOR SPECTRUM SHARING BY PRIMARY AND SECONDARY NETWORKS BASED ON COGNITIVE BEAMFORMING

CROSS REFERENCE TO RELATED APPLICATIONS

This application claims priority under 35 U.S.C. § 119 (e) of U.S. Provisional Application No. 62/811,254, filed on 27 Feb. 2019, entitled "Method for Spectrum Sharing by Cellular and WiFi Networks Based on Cognitive Beamforming," the disclosure of which is hereby incorporated by reference.

STATEMENT REGARDING FEDERALLY SPONSORED RESEARCH OR DEVELOPMENT

This invention was made with government support under Grant Number 1618727 awarded by the National Science Foundation. The government has certain rights in the invention.

BACKGROUND

Mobile data traffic is increasing at an unprecedented rate, which poses a significant burden on the capacity of the underlying wireless network infrastructure, often referred to as spectrum crunch. Device manufacturers have been collaborating with Service Providers (SPs) to extend cellular wireless systems typically operating on licensed spectrum bands based on centrally scheduled channel access, e.g., LTE/LTE-A, to unlicensed bands so as to harvest additional spectrum resources. To enable fair spectrum sharing with wireless systems that operate on unlicensed bands with carrier-sensing-based channel access, e.g., Wi-Fi, a number of coexistence mechanisms have been proposed, including LTE-U, licensed assisted access (LAA), enhanced LAA (eLAA), LTE-WLAN aggregation (LWA), and MulteFire technology. A common trait among these approaches is that they essentially base their spectrum sharing strategy on mutual temporal exclusion, i.e., they separate conflicting transmissions in the time domain. At most, one wireless system is allowed to access a given channel at each time instant while other interfering systems must back off.

SUMMARY

The technology provided herein can achieve higher spectrum utilization through a spectrum sharing approach based on cognitive beamforming. This technology can enable efficient spectrum sharing for heterogeneous wireless networks with different, possibly incompatible, spectrum access technologies on the same spectrum bands, without modifying the protocol stacks of existing wireless networks. Using this technology, a newly-deployed wireless network can access a spectrum band based on cognitive beamforming without mutual temporal exclusion, i.e., without interrupting the ongoing transmissions of coexisting wireless networks on the same bands, and without cross-technology communication.

The technology provides a multi-antenna secondary transmitter to access a channel without interfering with a primary wireless network by eavesdropping on on-going primary user transmissions and using the collected information to implement beamforming-based transmissions (see FIG. 1) with minimal interference to the primary user. The technology can leverage beamforming techniques and spatial diversity to enable multiple co-located wireless systems to access the same portion of the spectrum simultaneously without causing significant performance degradation to each other. The technology can operate with zero signaling exchange among the coexisting systems and no modification to the protocol stack of previously-deployed systems.

The present technology can be further summarized by the following list of features:

1. A method of sharing a frequency spectrum between a primary wireless network and a secondary wireless network coexisting with the primary wireless network, the method comprising: at a node of the secondary wireless network, the node comprising a plurality of antennas, at least one processor including a protocol stack, and memory:
    (a) at the plurality of antennas, receiving incoming signals transmitted on a same frequency band from one or more users of the primary wireless network and from one or more users of the secondary wireless network;
    (b) at a bottom of the protocol stack integrated between the plurality of antennas and upper layers of the protocol stack, determining a beamforming scheme for transmission to scheduled users of the secondary wireless network; and
    (c) from the plurality of antennas, transmitting outgoing signals to the scheduled users of the secondary wireless network according to the beamforming scheme.

2. The method of feature 1, further comprising, in step (b), determining the beamforming scheme to maximize spectrum utilization by users in the primary wireless network and the secondary wireless network and to minimize interference between the primary wireless network and the secondary wireless network and/or between the scheduled users of the secondary wireless network.

3. The method of any of features 1-2, wherein step (b) further comprises:
    determining beamforming coefficients based on the selected beamforming scheme, extracted channel state information, a schedule of secondary users, a number of primary users sharing the frequency band, and a number of the plurality of antennas; and
    precoding data bit-streams based on the beamforming coefficients for transmission on the plurality of antennas to the scheduled users.

4. The method of any of features 1-3, further comprising, at a physical layer driver at the bottom of the protocol stack in communication with the plurality of antennas:
    on a primary receiver chain, receiving and demodulating the incoming signals from the primary wireless network;
    on a secondary receiver chain, receiving and demodulating the incoming signals from the secondary wireless network; and
    on a transmission chain, precoding outgoing data bit-streams according to the beamforming scheme and modulating the outgoing data bit-streams for transmission from the plurality of antennas to the scheduled users of the secondary wireless network.

5. The method of any of features 1-4, wherein step (b) further comprises, on a cognitive sensing engine at the bottom of the protocol stack, one or more of extracting channel state information of the primary wireless network and the secondary wireless network, analyzing traffic information of the primary wireless network, and detecting interference between the primary wireless network and the secondary wireless network.

6. The method of any of features 1-5, wherein the channel state information includes channel gain information including effects of distance, power decay, path loss, scattering, multi-path, small-scale fading, and fast fading.

7. The method of any of features 1-6, wherein the channel state information is estimated from a priori knowledge of transmitted signals or from received signals using a blind or semi-blind channel estimation technique, or a combination thereof.

8. The method of any of features 1-7, wherein detecting interference comprises determining power of received interference and noise at each of the plurality of antennas based on modulation parameters of signals received from the primary wireless network.

9. The method of any of features 1-8, wherein analyzing traffic information includes merging extracted channel state information and average and received power received at each of the plurality of antennas, calculating an estimation of primary user traffic, and determining a performance indicator indicative of network activity surrounding the node.

10. The method of any of features 1-9, wherein analyzing traffic information includes detecting a presence of ongoing traffic of the primary wireless network and determining a traffic activity key performance indicator representative of ongoing primary system traffic, an impact of the primary system traffic on the secondary wireless network, and an impact of the secondary wireless network on the primary wireless network.

11. The method of any of features 1-10, wherein step (b) further comprises, on a beamforming engine at the bottom of the protocol stack, selecting the beamforming scheme, determining beamforming coefficients based on the selected beamforming scheme, and passing the beamforming coefficients to a physical layer driver for precoding data bit-streams for transmission on the plurality of antennas to the scheduled users.

12. The method of any of features 1-11, wherein step (b) further comprises selecting the beamforming scheme based on a level of traffic in the primary wireless network and/or the secondary wireless network.

13. The method of any of features 1-12, wherein step (b) further comprises selecting the beamforming scheme from zero forcing beamforming, maximum radio transmit (MRT) beamforming, transmit Wiener precoding, random beamforming, dirty paper coding (DPC), weighted minimum mean squared error (MMSE) precoding, and signal-to-leakage-and-interference ratio (SLNR).

14. The method of any of features 1-13, wherein step (b) further comprises receiving from a scheduling module a schedule of the scheduled users on the secondary wireless network to be served in a time slot.

15. The method of any of features 1-14, wherein the schedule is received from a medium access control layer of the protocol stack.

16. The method of any of features 1-16, wherein the primary wireless network and the secondary wireless network are each operative to transmit with a wireless protocol comprising a WiFi protocol, LTE protocol, or IEEE 802 family protocol.

17. A system for sharing a frequency spectrum between a primary wireless network and a secondary wireless network coexisting with the primary wireless network, comprising:
    a node of the secondary wireless network comprising a plurality of antennas, at least one processor, and memory;
    the at least one processor including a protocol stack, a bottom of the protocol stack integrated between the plurality of antennas and upper layers of the protocol stack; and
    machine-readable instructions stored in the memory, that upon execution by the at least one processor cause the system to carry out operations at the bottom of the protocol stack comprising:
        (a) on a receiver path at the bottom of the protocol stack in communication with the plurality of antennas, receiving incoming signals transmitted on a same frequency band from one or more users of the primary wireless network and from one or more users of the secondary wireless network;
        (b) determining a beamforming scheme for transmission to scheduled users of the secondary network; and
        (c) on a transmission path at the bottom of the protocol stack to the plurality of antennas, transmitting outgoing signals to the scheduled users of the secondary network according to the beamforming scheme.

18. The system of feature 17, wherein the at least one processor includes a physical layer driver at the bottom of the protocol stack in communication with the plurality of antennas, comprising:
    a primary receiver chain operative to receive and demodulate incoming signals from the primary wireless network;
    a secondary receiver chain operative to receive and demodulate incoming signals from the secondary wireless network; and
    a transmission chain operative to precode outgoing data bit-streams according to the beam forming scheme and modulate the outgoing data bit-streams for transmission from the plurality of antennas to the scheduled users of the secondary wireless network.

19. The system of any of features 17-18, wherein the at least one processor includes a cognitive sensing engine at the bottom of the protocol stack comprising one or more of:
    a channel state information extraction module operative to extract channel state information of the primary wireless network and the secondary wireless network;
    a traffic analyzer module operative to analyze traffic by users of the primary wireless network; and
    an interference detector module operative to detect interference between the primary wireless network and the secondary wireless network.

20. The system of any of features 17-19, wherein the at least one processor includes a beamforming engine at the bottom of the protocol stack operative to select the beamforming scheme, determine beamforming coefficients based on the selected beamforming scheme, and pass the beamforming coefficients to a physical layer driver for precoding data bit-streams for transmission on the plurality of antennas to the scheduled users.

DETAILED DESCRIPTION

The technology described herein provides methods and systems that utilize a cognitive beamforming approach to spectrum sharing for 5G and other wireless networks. The technology can operate without requiring signaling exchange between coexisting networks or modifications to the protocol stack of the existing wireless networks.

I. Spectrum Sharing Network Problem Formulation

Figure 1:
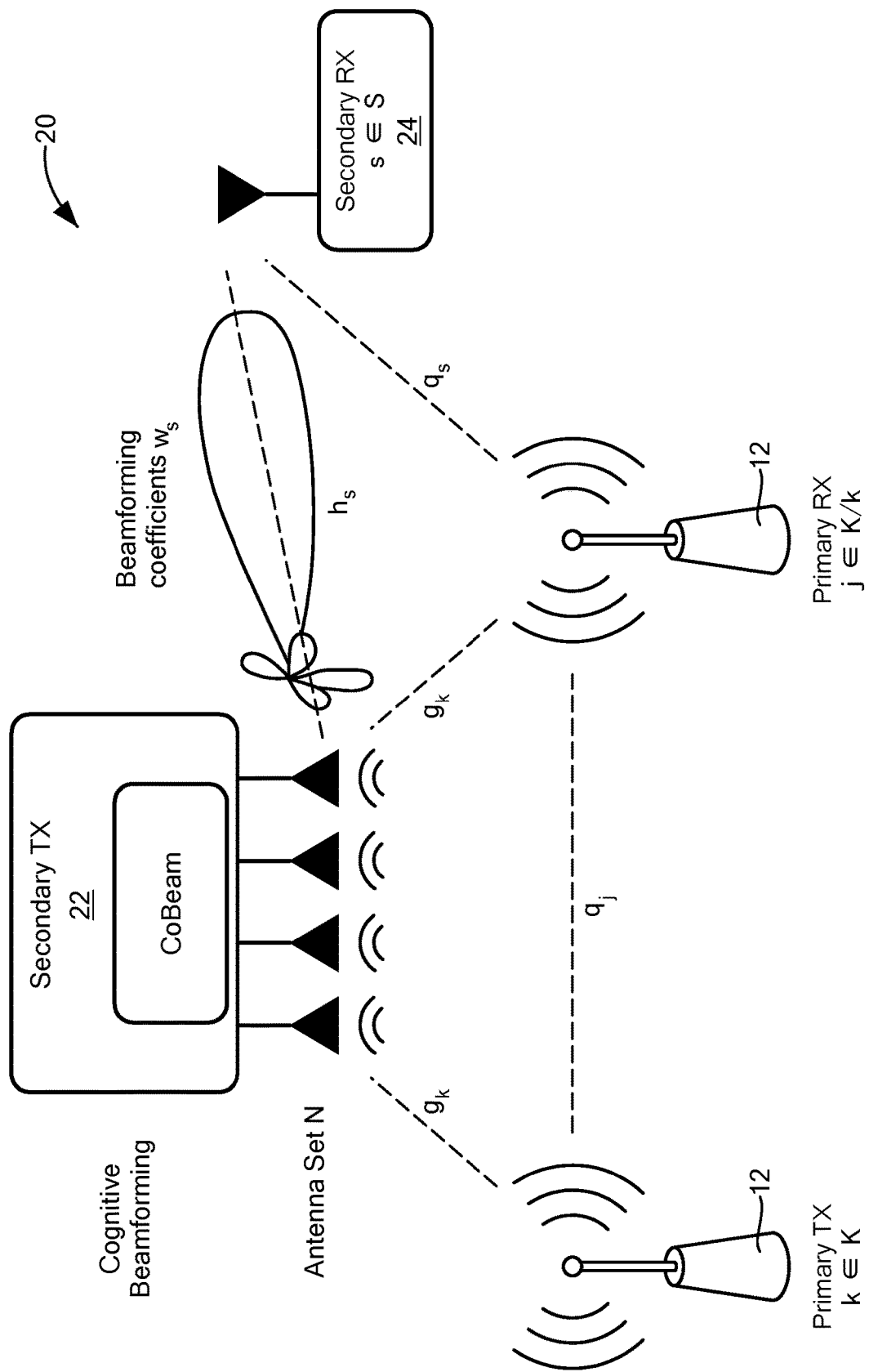
FIG. 1 is a schematic illustration of beamforming-based spectrum sharing between primary and secondary wireless networks co-located on the same spectrum bands.

In the following description, an incumbent (possibly licensed) wireless network is referred to as a primary system, and a second wireless network intended to coexist with the primary system is referred to as a secondary system. A cognitive beamforming technology for sharing of a spectrum where a primary and a secondary system coexist on the same spectrum bands can be described with reference to heterogeneous 5G wireless networks as depicted in FIG. 1. In particular, the primary system 10 includes of a set $\mathcal{K}$ of single-antenna transceivers 12 communicating with each other in a point-to-point, multicast, or broadcast fashion. As shown in FIG. 1 the secondary system 20, instead, is a $\mathcal{N}$-antenna transceiver 22 willing to communicate with a set $\mathcal{S}$ of single-antenna secondary receivers 24. $\mathcal{N}$ denotes the set of antennas available at the secondary transmitters.

Some notations are introduced as follows: The transmission time is divided into a set $\mathcal{T}$ of consecutive time slots. Block fading channel is considered, i.e., the wireless channel is considered to be fixed in each time slot $v \in \mathcal{T}$. The channel coefficients between the primary and secondary systems can be defined as illustrated in FIG. 1. Let $$h_s^v = (\sqrt{\bar{h}_{ns}^v} \tilde{h}_{ns}^v)_{n \in \mathcal{N}}$$

denote the channel gain vector between secondary transmit antennas in $\mathcal{N}$ and secondary receiver $s \in \mathcal{S}$, in time slot $v \in \mathcal{T}$, that is, the channel of the secondary signal, where $\bar{h}_{ns}^v$ and $\tilde{h}_{ns}^v$ represent the path loss and the small-scale fading coefficient, respectively. Similarly, let $$g_k^v = (\sqrt{\bar{g}_{nk}^v} \tilde{g}_{nk}^v)_{n \in \mathcal{N}}$$

denote the channel coefficient vector between the secondary transmit antennas in $\mathcal{N}$ and primary user $k \in \mathcal{K}$ in time slot $v \in \mathcal{T}$, that is, the channel causing interference to the primary system. Finally, let $$q_j^v = (\sqrt{\bar{q}_{kj}^v} \tilde{q}_{hj}^v)_{k \in \mathcal{K}} \text{ and } q_s^v = (\sqrt{\bar{q}_{ks}^v} \tilde{g}_{ks}^v)_{k \in \mathcal{K}}$$

denote the vector of channel coefficients between a primary transmitter $k \in \mathcal{K}$ and a primary receiver $j \in \mathcal{K}/k$, and a secondary receiver $s \in \mathcal{S}$, respectively. As shown in FIG. 1, the two channel vectors $q_j^v$ and $q_s^v$ represent the channel of the signal to the primary system and the channel of the received interference to the secondary system, respectively.

Referring to a scenario as in FIG. 1 where a multi-antenna secondary transmitter is willing to communicate with a set of single-antenna secondary receivers, the secondary transmitted signal in time slot $v \in T$ can be represented as $$x^v = \sum_{s \in \mathcal{S}_{sch}} \sqrt{p_s} w_s^v x_s^v, \quad (1)$$

Where $\mathcal{S}_{sch} \subset \mathcal{S}$ is the scheduled set of secondary users to be served in time slot $v$. In the above formulation (1), $p_s$ is the secondary transmitter signal power, $x_s^v$ is the data symbol intended for the secondary receiver $s \in \mathcal{S}_{sch}$, and $w_s^v = (w_{ns}^v)_{n \in \mathcal{N}}$ is the beamforming vector employed at the $\mathcal{N}$-antenna secondary transmitter, where $w_{ms}^v$ where was is the channel coefficient between antenna $n \in \mathcal{N}$ and secondary receiver s.

Consequently, according to the channel gain vector formulations above, the corresponding signal-to-interference-plus-noise ratio (SINR) at primary $\mathcal{K}$ and secondary $\mathcal{S}_{sch}$ receivers in time slot $v \in \mathcal{T}$ can be expressed as $$SINR_s^v = \frac{|\sqrt{p_s} w_s^v h_s^v|^2}{\left|\sum_{s' \in \mathcal{S}_{sch}/s} \sqrt{p_{s'}} w_{s'}^v h_{s'}^v\right|^2 + \left|\sum_{k \in \mathcal{K}} \sqrt{p_k} q_{ks}^v\right|^2 + \sigma_s^2} \quad (2)$$

$$SINR_j^v = \frac{|\sqrt{p_k} q_{kj}^v|^2}{\left|\sum_{s \in \mathcal{S}_{sch}} \sqrt{p_s} w_s^v g_k^v\right|^2 + \left|\sum_{\substack{k' \in \mathcal{K}/k \\ j' \in \mathcal{K}/j}} \sqrt{p_{k'}} q_{k'j}^v\right|^2 + \sigma_k^2} \quad (3)$$

for the secondary receiver $s \in \mathcal{S}_{sch}$, and for primary receiver $j \in \mathcal{K}/k$ when served by primary transmitter $k \in \mathcal{K}$, respectively.

Based on the above problem formulation, a harmonious spectrum coexistence scheme is achieved when the secondary transmitter beamforming vectors $\{w_s^v\}$, $s \in \mathcal{S}_{sch}$ guarantee satisfactory SINR levels at the secondary receivers, while not degrading the SINR at the primary receivers. Thus, the cognitive beamforming technology can determine, for each time slot $v$, the optimal beam-forming vectors $\{w_s^v\}$ maximizing the spectrum utilization, i.e., arg max$\{(SINR_s^v)_{s \in \mathcal{S}_{sch}} + (SINR_k^v)_{k \in \mathcal{K}}\}$, while guaranteeing high fairness values between the coexisting wireless networks, e.g., arg max$\{(\Sigma_{s \in \mathcal{S}_{sch}}^{k \in \mathcal{K}} SINR_s^v + SINR_k^v)^2 / [(|\mathcal{K}| + [\mathcal{S}_{sch}|)$ $\Sigma_{s \in \mathcal{S}_{sch}}^{k \in \mathcal{K}} (SINR_s^v)^2 + (SINR_k^v)^2]\}$.

The spectrum sharing optimization problem discussed above is however not easy to solve in practical settings, as it faces some challenges, summarized as follows:

Lack of coordination among coexisting networks. Low-interference spectrum sharing in cross-technology coexistence scenarios is often achieved via coordinated channel access, which requires signaling exchange among the co-existing wireless technologies. In turn, this may require significant modifications of the standard protocol stack. Conversely, the technology described herein can achieve spectrally-efficient and fair spectrum sharing with zero cross-technology signaling exchanges.

Lack of a central controller. Optimal sharing of network resources (e.g., bands, spectrum access) can be achieved through a central controller with a holistic view of the spectrum access strategies at the different network nodes. However, this requires significant signaling exchange, possibly dedicated infrastructure, and results in a single point of failure. Instead, the technology described herein seeks to achieve optimal spectrum sharing without a central controller but in a fully distributed fashion.

Backward compatibility and transparency. Spectrum sharing mechanisms such as time coordination, signaling, and use of a central controller often require modifications to the upper layers of the protocol stack. Differently, the technology described herein works at the very low layers of the protocol stack and requires no modification of upper layer protocols. To this end, the technology is backward compatible and it can be integrated into the secondary transmitter protocol stack without requiring any upper layer adaptation. Furthermore, once installed at the secondary system, the technology is completely transparent to the primary system and the secondary receivers.

Described further below is a cognitive-beamforming-based framework for secondary transmitters that employs a three-module architecture, with modules termed programmable physical layer driver, cognitive sensing engine, and beamforming engine. Section II provides an overview of the cognitive beamforming framework architecture. Section III provides a more detailed discussion of the operation and functionalities implemented in each of the modules.

II. Cognitive Beamforming Framework Architecture Design

Figure 2:
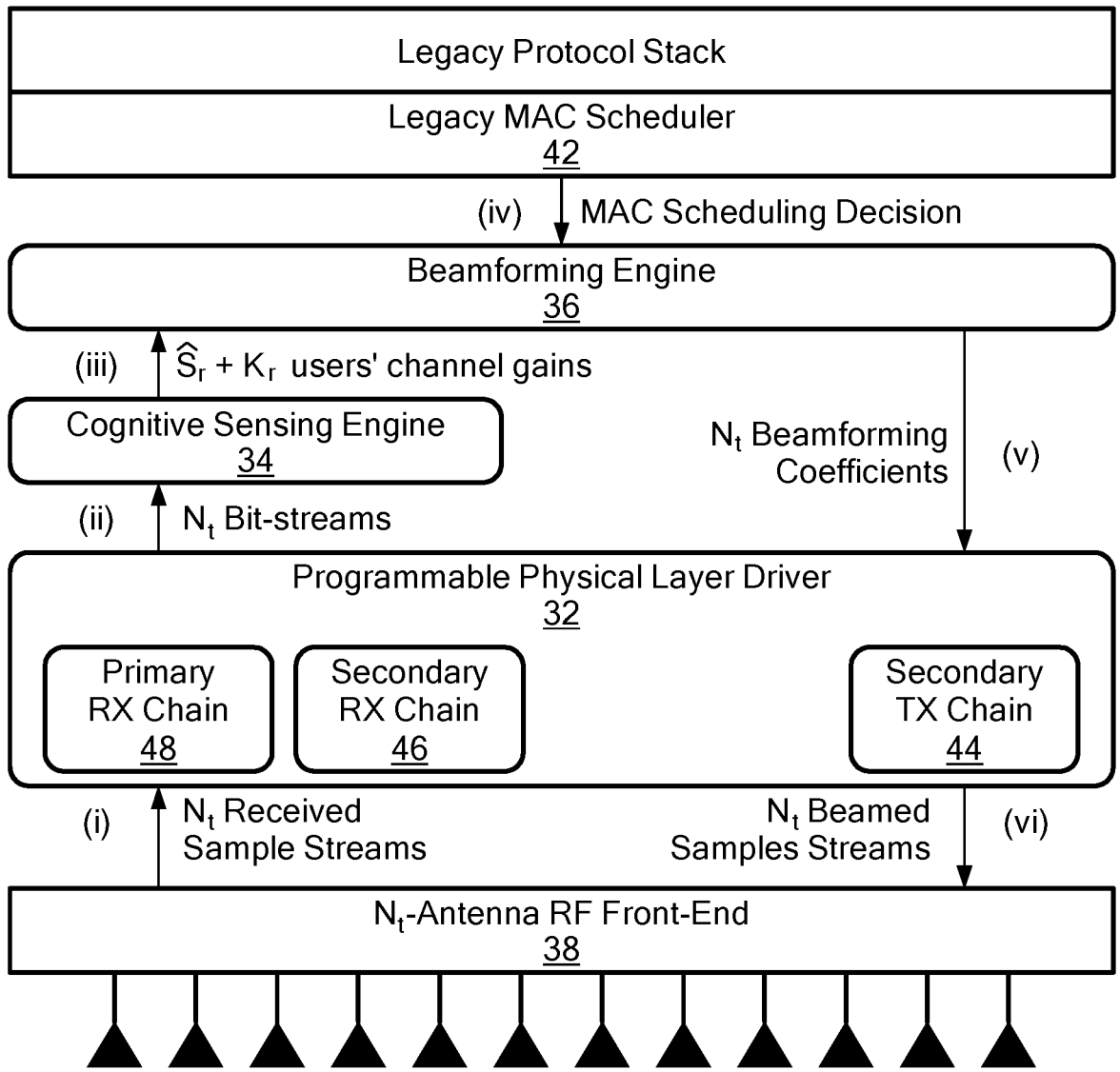
FIG. 2 is a schematic illustration of an architecture of a cognitive beamforming system.

As illustrated in FIG. 2, the cognitive beamforming architecture is structured into three distinct yet interacting components, a programmable physical layer driver 32, a cognitive sensing engine 34, and a beamforming engine 36. The programmable physical layer driver interfaces the transmitter and receiver chains of the radio front-end 38, and interfaces with the beamforming engine through the cognitive sensing engine. The beamforming engine interacts with the legacy medium access control (MAC) scheduler 42 of the secondary transmitter. In this way, the cognitive beamforming technology operates at the bottom layer of the protocol stack, below the MAC.

Referring to FIG. 2, the programmable physical layer driver interfaces the transmitter and receiver chains of the RF frontend (i), demodulates the received samples, and passes them to the cognitive sensing engine (ii), which performs a wireless channel analysis targeted to extract the channel gains. The latter are passed to the beamforming engine (iii), which interacts with the legacy medium access control (MAC) scheduler of the secondary transmitter to calculate the beamforming coefficients for the secondary users to be served (iv). These coefficients are then passed to the programmable physical layer driver (v), which precodes and modulates the data bit-streams to be sent to the RF front-end (vi).

Programmable Physical Layer Driver. For each available antenna, the programmable physical layer driver 32 implements the secondary system transmission chain 44 and receiver chain 46, which can be in multiple wireless technologies, e.g., Wi-Fi, LTE, ZigBee, and Bluetooth. Moreover, this module implements an additional receiver chain 48 able to receive and demodulate primary users' data packets (e.g., Wi-Fi), for a total of two receiver chains and one transmitter chain for each available antenna. In the receiver chains, the driver demodulates baseband digital samples into bit-streams that are passed up to the cognitive sensing engine 34 for traffic analysis. In the transmitter chains, the driver performs physical layer spectrum access, employing the beamforming coefficients calculated by the beamforming engine to precode and then modulate the data to be transmitted. This module operates at the physical layer of the protocol stack where it can demodulate wireless signals coming from the radio front-end into bit-streams and vice-versa. The rationale behind its operations is to hide the physical-layer details of the diverse coexisting wireless technologies to the upper layers of the protocol stack, and hence ensure the cognitive beamforming technology's transparency and preserve its backward compatibility.

Cognitive Sensing Engine. Based on the demodulated bit-streams fed by the programmable physical layer driver, the cognitive sensing engine 34 has a task of extracting channel gain information and perform primary users' traffic analysis.

The channel gain information, e.g., CSI $h_s^v$, $g_k^v$, and $q_s^v$ for time slot v defined in Section I, represents the channel characteristics between a primary or secondary user and the secondary transmitter where the cognitive beamforming technology is operating. This information, which accounts for the effects of distance, power decay, path loss, scattering, multi-path, small-scale fading, and fast fading on the wireless channels, can be estimated based on a priori knowledge of the transmitted signals such as known pilot symbols, golden sequences, or preambles. An example of channel gain estimation is discussed below in Section III. It is practical for the secondary transmitter to perform the channel estimation if it has the a priori knowledge of the transmitted signals, e.g., when the primary system adopts a known or standard-defined physical layer preamble. In other cases, blind or semi-blind channel estimation techniques can be employed by the secondary systems.

Through the channel gain estimation, the cognitive sensing engine is also able to detect the presence of the ongoing traffic of the primary system and further analyze its traffic pattern. Note that all the operations in the cognitive sensing engine are performed upon demodulated data coming from the programmable physical layer driver, and do not require any coordination with the primary system users, that is, no cross-technology signaling is needed. This ensures the cognitive beamforming technology's transparency with respect to primary users. The estimated channel gains can be used as the building blocks of any beamforming-based precoding schemes, and they are, once extracted, passed to the beamforming engine.

Beamforming Engine. Apart from the channel gain information, the beamforming engine 36 is also fed with a primary user traffic activity key performance indicator (KPI), based on which the beamforming engine selects the optimal spectrum sharing beamforming scheme and then calculates the corresponding beamforming coefficients (i.e., $W_s$ in FIG. 1).

The KPI represents whether there is ongoing primary system traffic, the impact that the primary system has on the secondary transmitter at which the cognitive beamforming technology is installed, as well as, based on channel reciprocity of time division duplexing (TDD) systems, the impact of interference from omnidirectional secondary transmissions on the primary users. Basing its decision upon the KPI, the beamforming engine selects the optimal beamforming scheme that maximizes the spectrum utilization while guaranteeing fairness between the coexisting wireless networks. Optimal choices can be, for example, maximum ratio transmission (MRT), which maximizes the spectrum utilization favoring the secondary system in case of non-detected primary technology; or zero-forcing (ZF) beamforming, which can be employed to deliver data at secondary receivers minimizing the interference caused at the primary system by nulling the received power at primary users in case of intense primary user channel activity. Other beamforming schemes can be used, depending on the application, such as, without limitation, transmit Wiener precoding, random beamforming, dirty paper coding (DPC), weighted minimum mean squared error (MMSE) precoding, and signal-to-leakage-and-interference ratio (SLNR).

Upon determining the optimal beamforming scheme, the beamforming engine constructs the optimal beamforming co-efficient vectors based on the channel gains passed by the cognitive sensing engine and on the secondary user schedule selection performed by the legacy medium access control (MAC) protocol stack scheduler. Specifically, given the set of scheduled secondary users $\mathcal{S}_{sch}$ to be served in time slot $v \in \mathcal{T}$, the number of detected primary users sharing the spectrum $\mathcal{K}$, and the number of antennas at the radio front end $\mathcal{N}$, the beamforming engine calculates the optimal beamforming coefficients matrix G:

$$G \in \mathbb{C}^{N_t \times (S_r + K_r)} = \{w_s\}, s \in \{1, \ldots, \hat{S}_r + K_r\}, \quad (4)$$

where $w_s = \{w_{ns}\}$, $n \in \{1, \ldots, Ni\}$ is the set of precoding coefficients for the wireless link from the n-th transmitting antenna to primary or secondary user s, and $N_t = |\mathcal{N}|$, $\hat{S}_r = |\mathcal{S}_{sch}|$ and $K_r = |\mathcal{K}|$ represent the cardinality of the sets described above. Depending on the selected beamforming scheme, these coefficients are passed back down to the physical layer driver, which employs them to precode the users' data bit-streams in each of the N secondary system transmitter chains, prior to modulation.

The result of the cognitive beamforming technology's lower-layer operations is a cognitive-based beamforming module that attempts to achieve fair spectrum sharing coexistence among heterogeneous technologies, and that can be seamlessly integrated at any secondary system protocol stack without any protocol modification or cross-technology signaling required. In the following section, a description of an implementation of the cognitive beamforming technology is provided for LTE secondary operations in the unlicensed spectrum, designed to guarantee coexistence with Wi-Fi.

Figure 3:
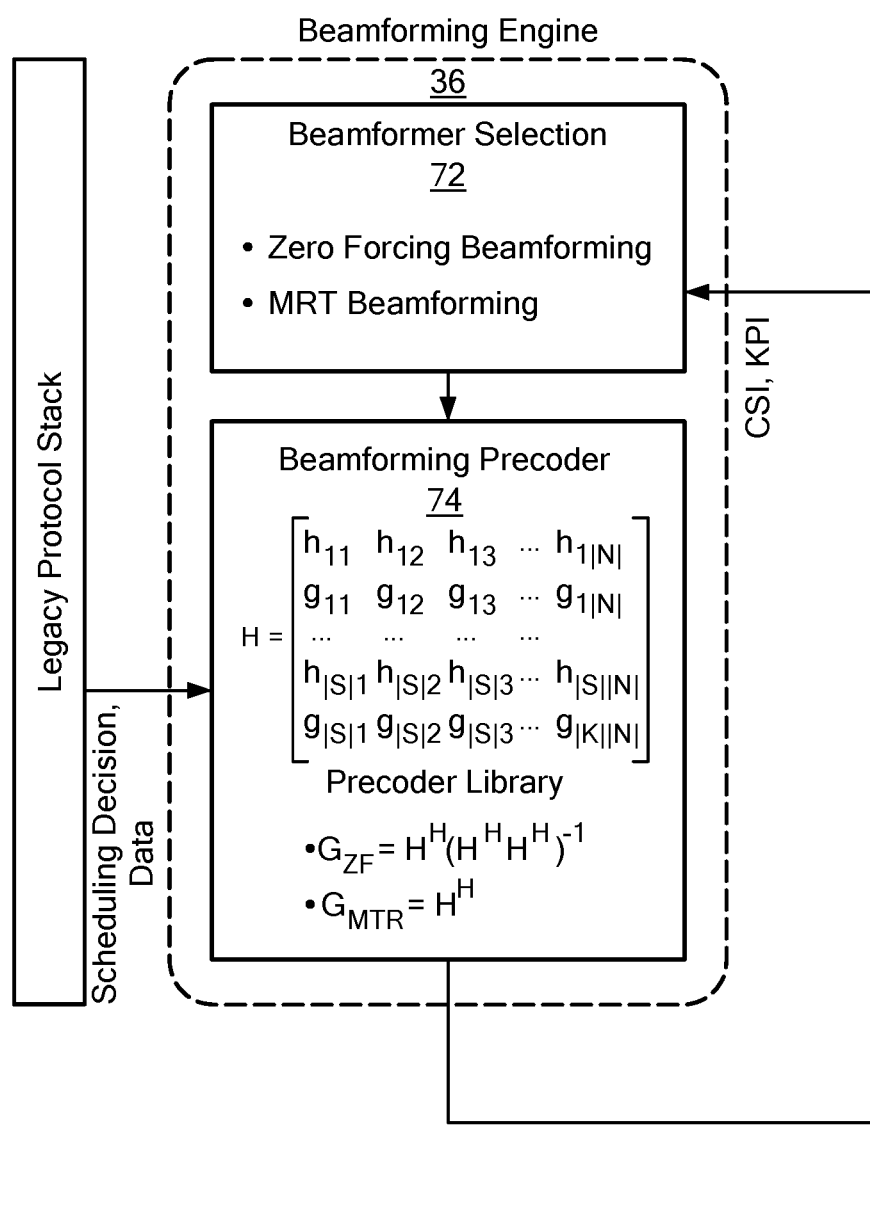
FIG. 3 is a schematic diagram of modules of a cognitive beamforming method and system.
Figure 3:
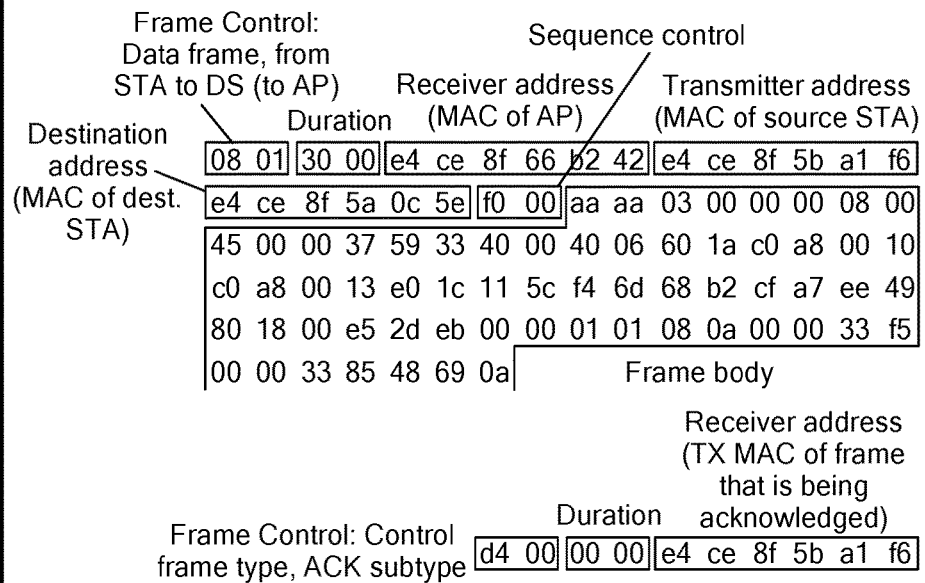
Figure 3:
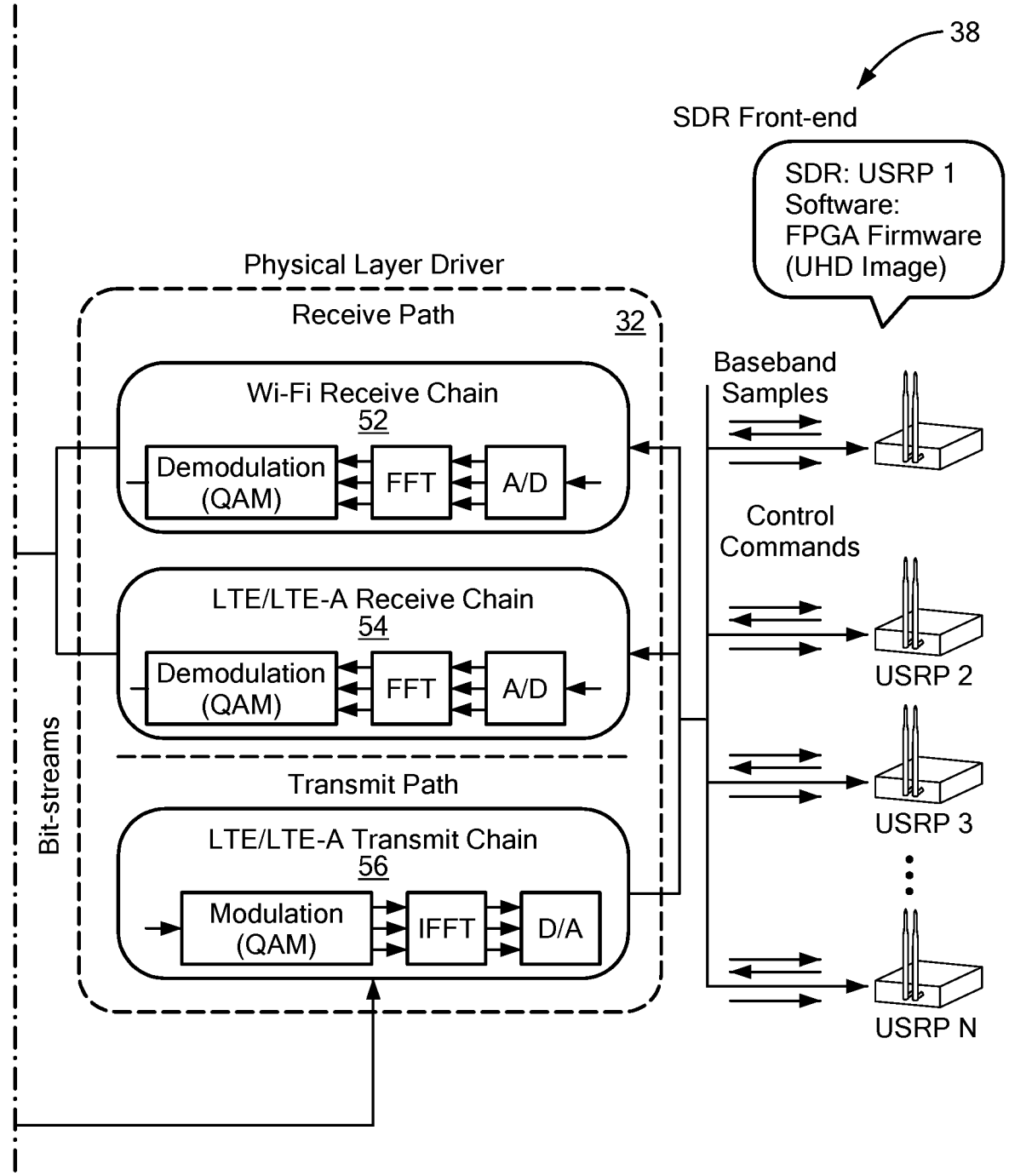

III. Cognitive Beamforming Technology-Based Spectrum Sharing for LTE in Unlicensed Bands An implementation of cognitive beamforming technology is described, for example, in a multi-antenna LTE secondary transmitter in the unlicensed industrial, scientific and medical (ISM) bands populated by Wi-Fi devices, among others. A schematic illustration of the implementation is shown in FIG. 3. Described herein are the implementation details of the three components described in Section II above. The implementation was also prototyped over a testbed based on Universal Software Radio Peripheral (USRP) N210s, a commercial software-defined radio (SDR) front-end, to realize the coexistence of Wi-Fi and LTE/LTE-A networks on the same unlicensed bands. The spectrum sharing results obtained through an extensive experimental campaign are described below in Section IV. In the following, LTE in Unlicensed band is referred to as U-LTE. It will be appreciated that other wireless primary and secondary networks can be used.

Programmable Physical Layer Driver. In this implementation, the cognitive beamforming technology incorporates two receiver chains 52, 54 in the physical layer module. The first chain 52 can be based on, for example, IEEE 802.11 to eavesdrop on the Wi-Fi traffic, while the second chain 54 receives traffic transmitted by U-LTE user terminals. The Wi-Fi receiver can be based on the Orthogonal-Frequency-Division-Multiplexing (OFDM), which leverages a number of closely spaced orthogonal subcarriers. For example, it can adopt the 802.11a packet format having a preamble and a payload. The preamble contains two standard-defined training fields that are used for time and frequency synchronization and channel state information (CSI) estimation. Each Wi-Fi OFDM symbol contains 52 subcarriers, where 48 of them are used for data symbols while the rest are pilot symbols for tracking frequency, phase, and amplitude variations over the burst. The LTE receiver chain can be based instead on Single Carrier Frequency Division Multiple Access (SC-FDMA) as specified in the LTE uplink standard. SC-FDMA uses closely spaced orthogonal subcarriers similar to the OFDM and OFDMA schemes with a special precoding process to minimize the peak-to-average-power ratio (PAPR) and accordingly optimize the power consumption.

On the transmitter side, the cognitive beamforming technology can implement, for example, an LTE down-link, which is based on an Orthogonal-Frequency-Division Multiple Access (OFDMA) scheme, which defines a physical resource block as the smallest unit of resources that can be allocated to a user. It contains 12 adjacent subcarriers over a time slot (i.e., 0.5 ms). While each subcarrier has a bandwidth of 15 kHz, the system bandwidth can vary between 1.4 MHz and 20 MHz. The transmitter chain leverages a beamforming precoder which receives the precoding coefficients G from the beamforming engine. In the transmitter chain 56, the received bit-streams are digitally precoded with the received coefficients, modulated, and then fed to the multi-antenna radio front end.

Cognitive Sensing Engine. The cognitive sensing engine 34 performs wireless channel gain extraction and primary user traffic pattern analysis to provide physical- and MAC-layer information for cognitive beamforming. For example, it can incorporate three main sub-modules, an interference detector 62, a CSI extractor 64, and a traffic analyzer 66, to process the Wi-Fi and LTE bit-streams collected through the physical layer module discussed above. The sub-modules can operate simultaneously and synchronously, minimizing processing delays, and can generate consistent CSI estimates that match the fast varying channel characteristics. The functionalities of each sub-module are described as follows.

(i) Based on a priori information on the receiver and transmitter OFDM parameters including center frequency, bandwidth, occupied tones and cyclic prefix length, the interference detector can evaluate the power of received interference and noise at each of the N, U-LTE antennas. This can be accomplished by integrating the intensity of the received Wi-Fi symbols every time an 802.11a preamble is detected, accounting for the frequency of received Wi-Fi packets.

(ii) Standard-defined physical-layer 802.11a synchronization sequences and known secondary users LTE/LTE-A preambles can also trigger the CSI extractor 64. This module can employ different estimators, such as Least Square (LS) and Least Mean Square (LMS), to extract CSI information through analyzing pilot OFDM symbols and pilot populated subcarriers to track down channel attenuation and phase rotation effects. The extracted CSI is then associated with the corresponding frame every time a U-LTE or Wi-Fi synchronization sequence is detected, for all the N secondary transmitter antennas.

(iii) Merging the Wi-Fi traffic traces with the Wi-Fi CSI obtained from the CSI extractor 64 and the average and received power evaluated at the interference detector 62, the traffic analyzer 66 can perform primary user traffic analysis. It can calculate a running average estimation of the primary user traffic and come up with a KPI expressing the intensiveness of the surrounding Wi-Fi activity, for example, negligible or pervasive. This information is fed to the beamforming engine.

Beamforming Engine. The beamforming engine 36 can provide two functionalities. In a beamformer selection submodule 72, it can determine, based on primary system activity KPI received from the traffic analyzer the best beamforming scheme to maximize the spectrum efficiency while ensuring fair coexistence between the Wi-Fi and U-LTE networks. In a beamforming precoder submodule 74, it can also calculate the precoding coefficients for the selected beamforming scheme starting from the most recent CSI information for the scheduled set of users, in every time slot. Because of the possible inaccuracy of the CSI estimates, the effectiveness of a precoding scheme is determined by the degrees of freedom expressed by the ratio between the number of available antennas and the number of users whose channels are involved building the precoder $N_t/(S_s+K_r) > 1$, $K_r = |\mathcal{K}|$, and $S_s = |\mathcal{S}_{sch}|$.

The optimal beamforming scheme selection can rely upon a threshold-based binary decision involving the received Wi-Fi activity indicator. Such selection can be driven by spectrum efficiency considerations, i.e., it can adaptively favor beamforming schemes that attempt to achieve higher signal gain, while preserving the fairness between the coexisting Wi-Fi and U-LTE networks.

For example, a maximum ratio transmission (MRT) Beamforming scheme may be preferred in scenarios with low Wi-Fi traffic loads. Denoting $H_{mrt}$ as the channel matrix from the $\mathcal{N}$ secondary U-LTE transmitter antennas to the set of scheduled $\mathcal{S}_{sch}$ secondary receivers, and $(u_s)_{s \in \mathcal{S}_{sch}}$ being the vector of intended data for the users $s \in \mathcal{S}_{sch}$, the MRT beamforming coefficients can be based on the following linear precoder $$G \in \mathbb{C}^{N_t \times S_s} = H_{mrt}^H. \quad (5)$$

Consequently, the signal received at the $s \in \mathcal{S}_{sch}$ U-LTE users, denoted as y, is given by $$y = \begin{bmatrix} y_1 \\ y_2 \\ \ldots \\ y_{S_s} \end{bmatrix} = G \times H_{mrt} \times \begin{bmatrix} u_1 \\ u_2 \\ \ldots \\ u_{S_s} \end{bmatrix} = |H_{mrt}|^2 \times \begin{bmatrix} u_1 \\ u_2 \\ \ldots \\ u_{S_s} \end{bmatrix}. \quad (6)$$

This scheme results in a distortion-free effective channel, maximizing the signal power gain at the intended U-LTE users.

Differently, in high Wi-Fi traffic load scenarios, conservative low-interference beamforming schemes may be preferred in favor of better network fairness, such as zero-forcing (ZF) beamforming. Denoting $H_{zf}$ as the compound channel matrix from the secondary U-LTE transmitter antennas in $\mathcal{N}$ to the scheduled secondary U-LTE receivers in $\mathcal{S}_{sch}$ and the eavesdropped Wi-Fi users in $\mathcal{K}$, the ZF beamforming scheme can be obtained based on the precoder G defined as $$G = \in \mathbb{C}^{N_t \times (S_s + K_r)} = H_{zf}^H (H_{zf}^H \times H_{zf})^{-1}. \quad (7)$$

As a consequence of employing (7) as a precoder the resulting signal received at each network user y is given by $$y = \begin{bmatrix} y_1 \\ y_2 \\ \ldots \\ y_{S_s + K_r} \end{bmatrix} = G \times H_{zf} \times \begin{bmatrix} u_1 \\ u_2 \\ \ldots \\ u_{S_s + K_r} \end{bmatrix} = I \times \begin{bmatrix} u_1 \\ u_2 \\ \ldots \\ u_{S_s + K_r} \end{bmatrix}. \quad (8)$$

This beamforming scheme results in a diagonal effective channel minimizing the cross-user interference among U-LTE users while nulling the received signal power at the primary Wi-Fi network users.

Then, the signal-to-interference-plus-noise ratio (SINR) in (2) can be rewritten as $$SINR_{mrt} = \frac{P_s N_t}{S_s (P_s + 1)} \quad (9)$$

for MRT precoding and as $$SINR_{zf} = P_s \times \frac{N_t - (S_s + K_r)}{S_s + K_r} \quad (10)$$

for ZF precoding, where $P_s$ is the total transmission power employed at the secondary U-LTE transmitter.

At every time slot, the beamforming engine calculates the precoding coefficients for the scheduled set of secondary U-LTE users to serve, starting from the per-user CSI as in (5) and (7). The resulting precoding coefficients are finally passed down to the physical layer driver and employed in the transmit chain to weight the physical-layer bit-streams before modulating and feeding them to the SDR front end for transmission.

IV. Examples

Experimental results were obtained by implementing the cognitive beamforming technology on a software-defined radio (SDR)-based testbed employing USRP N210 SDR devices.

A. Experimental Setup

The testbed included a U-LTE network co-located with a series of Wi-Fi users on the same 2.4 GHz spectrum band. In all of the performed experiments, a secondary U-LTE transmitter endowed with up to four antennas transmitted data toward one single-antenna secondary U-LTE receiver, while a primary system transmission between a Wi-Fi transmitter (AP) and a Wi-Fi receiver (STA) was ongoing at the same time. Both the U-LTE and Wi-Fi networks were prototyped on USRP N210 based on a GNU Radio implementation. The Wi-Fi nodes were based on an IEEE 802.11a standard-compliant implementation. IEEE 802.11 Channel 13 was used in the experiments with center frequency of 2.472 GHz. The bandwidth was set to 5 MHz for the Wi-Fi network and 1 MHz for U-LTE, corresponding to approximately five LTE standard resource blocks. The prototype described here operated over narrower bandwidths than the ones defined in LTE and Wi-Fi standards because of the resource-hungry host-based baseband processing typical of SDR implementations, which would have resulted in unacceptable delays otherwise. However, in the cognitive beamforming technology, the operational bandwidth is a programmable physical layer parameter. More powerful host computing machine, or parallel base-band processing would allow the cognitive beamforming technology to operate over standard-compliant bandwidths.

First, a simple example is provided of spectrum sharing where U-LTE and Wi-Fi networks simultaneously injected MAC-layer packets into their protocol stacks and then transmitted them on the shared channel. This analysis highlighted (i) the throughput of the secondary system and (ii) the interference generated to the primary Wi-Fi system when employing the cognitive beamforming technology, for different beamforming techniques and varying numbers of antennas at the secondary U-LTE transmitter. Specifically, four transmission schemes were considered for the U-LTE transmission, i.e., (i) TX-1Ant (single-antenna omnidirectional), (ii) ZF-2Ant (Zero-Forcing Beamforming with two antennas), (iii) ZF-4Ant (zero-forcing beamforming with four antennas), and (iv) MRT-4Ant (maximum ratio transmission beamforming with four antennas). An extensive experimental campaign measured the aggregate throughput performance of the two spectrum sharing coexisting technologies for the ZF-4Ant and MRT-4Ant beamforming schemes while varying the locations of the secondary U-LTE receiver and the primary Wi-Fi users.

B. Experimental Results

Figure 4:
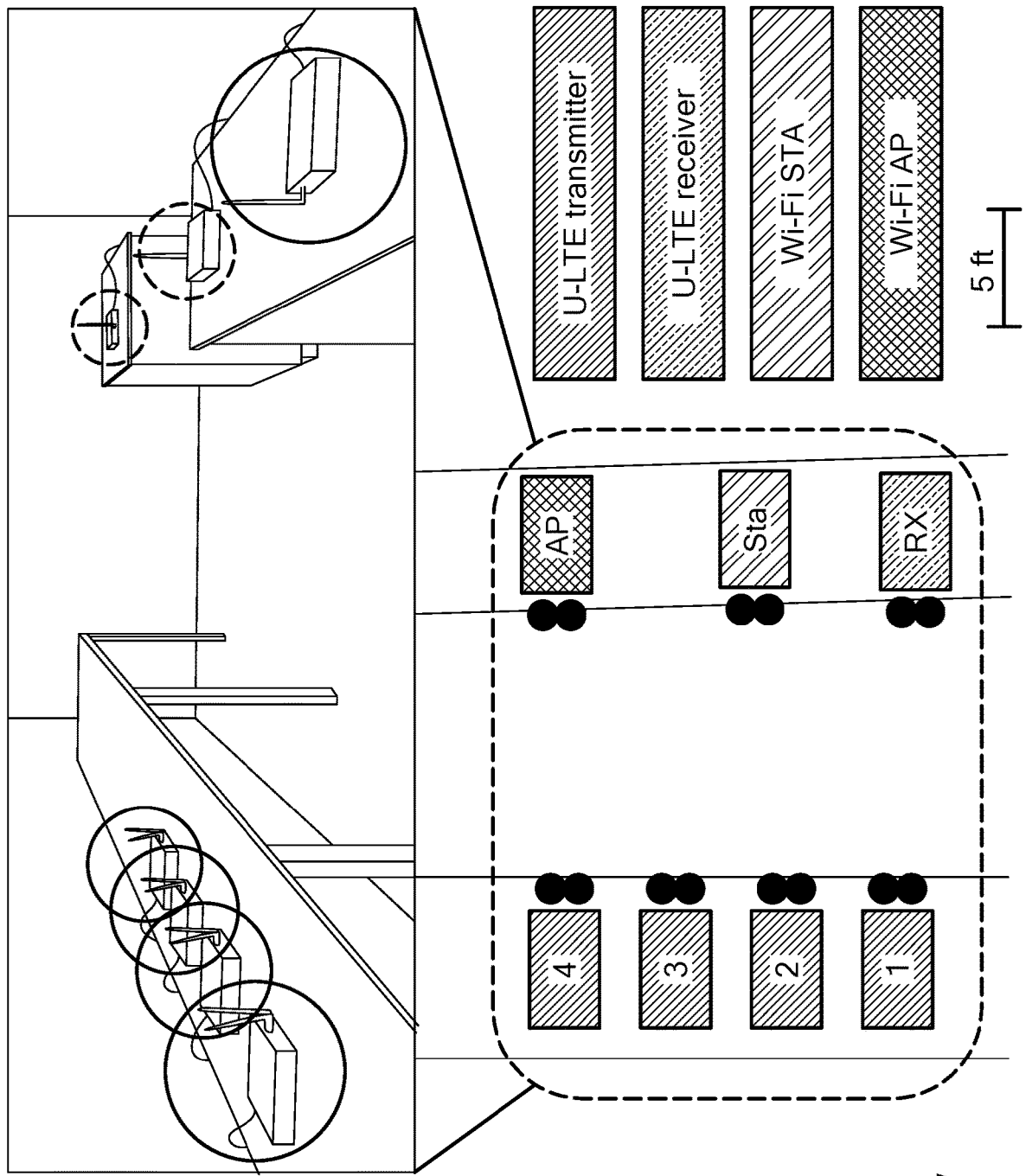
FIG. 4 is an illustration of a first scenario of a network deployment.
Figure 5:
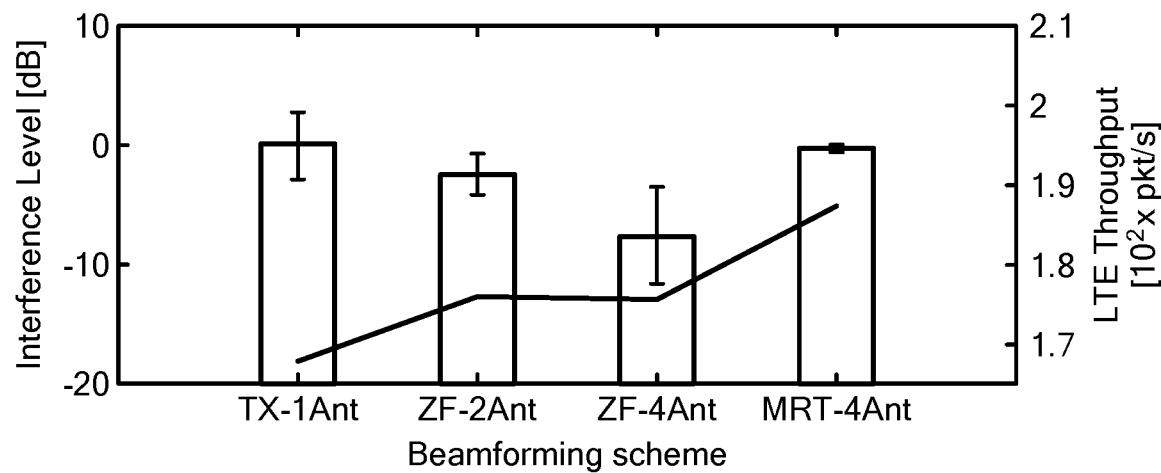
FIG. 5 is a graph of throughput of U-LTE (solid line) and corresponding caused interference levels (bars) in Scenario 1 of FIG. 4 for different beamforming schemes.

FIG. 4 illustrates a network scenario where the primary and secondary spectrum access technologies were co-located in a small room with significant mutual interference from simultaneous transmissions (referred to as Scenario 1). The effectiveness of the technology in efficiently addressing the spectrum sharing challenges was tested first, by measuring the interference generated at the Wi-Fi users when the U-LTE transmitter accessed the channel, as well as the corresponding throughput of the secondary networks, for four different beamforming schemes. The average results of ten 1-minute long experiments are reported in FIG. 5. The performance comparison of the four beamforming schemes presented in FIG. 5 shows how under MRT-4Ant the U-LTE network achieved the highest throughput among the four tested schemes, obtaining a 23% throughput gain with respect to single antenna omnidirectional TX-1Ant (215 packets/s vs 174 packets/s). At the same time, since MRT-4Ant aimed at maximizing the throughput of the U-LTE network, the interference to the primary system can be as high as that with TX-1Ant (i.e., no beamforming). Differently, the two ZF-based beamforming schemes achieved a better compromise between secondary system throughput and interference caused to Wi-Fi users. Specifically, under ZF-2Ant and ZF-4Ant the U-LTE network achieved approximately 12% throughput gain with respect to the omnidirectional scheme (192 packets/s). When compared to TX-1Ant and MRT-4Ant scheme, ZF-2Ant reduced the interference to the primary Wi-Fi network by 2 dB through ZF-based beamforming with two antennas; while ZF-4Ant achieved up to 8 dB of interference reduction gain with respect to the mentioned schemes thanks to the greater degrees of freedom for interference nulling deriving from the ratio $N_t/(S_s+K_r)$ discussed above in Section III. In short, it was experimentally verified how larger antenna/receiver ratios help to overcome the real-system CSI inaccuracies and improve the beamforming effectiveness.

Figure 6:
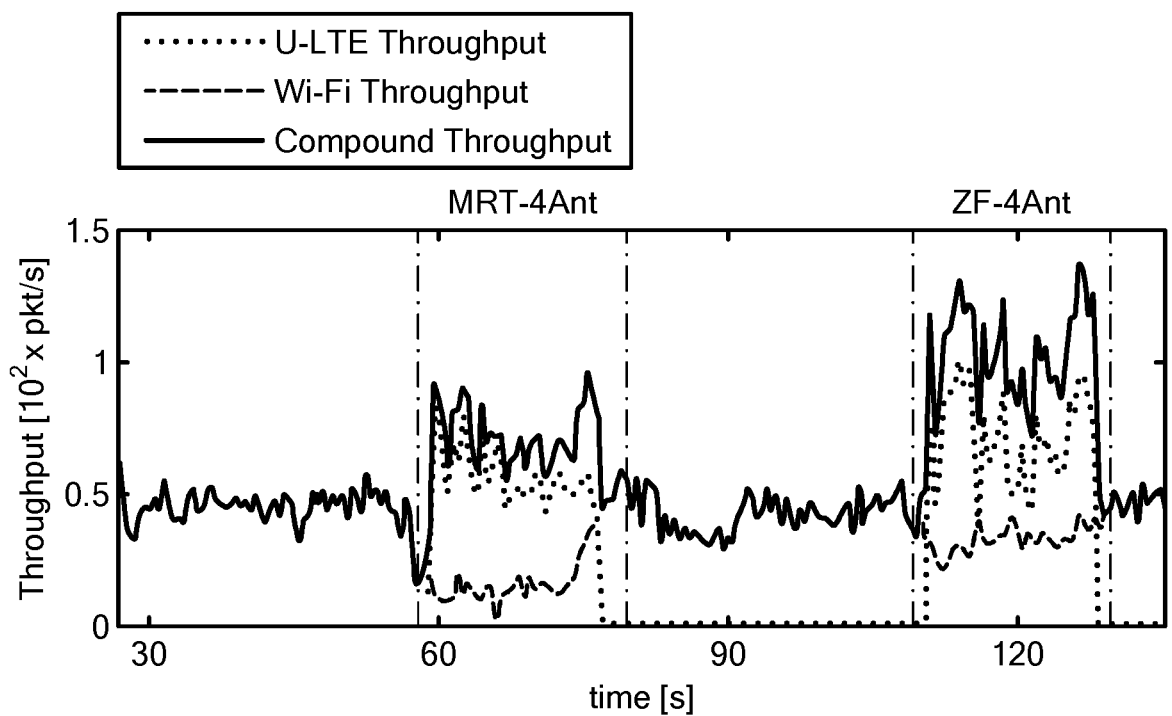
FIG. 6 is a graph of single-run U-LTE and Wi-Fi throughput measures for different beamforming schemes over time in Scenario 1 of FIG. 4.

FIG. 6 provides a closer look at the interactions between the coexisting Wi-Fi and U-LTE networks on a single-run experiment where the Wi-Fi network generated traffic at an average rate of 100 packets/s, while the U-LTE network accessed the channel twice, employing TX-1Ant and ZF-4Ant beamforming scheme, respectively, 60s and 110s after the beginning of the experiment. FIG. 6 illustrates the measured instantaneous throughput achieved by the two coexisting networks for this experiment in Scenario 1 (FIG. 4). It can be seen starting from 60s that the throughput of the Wi-Fi network got significantly degraded by the U-LTE activity when no interference-nulling beamforming scheme was used (i.e., ZF-4Ant), while the degradation was only marginal from second 110s when ZF-4Ant was employed. When employing ZF-4Ant at the secondary U-LTE, the aggregate primary and secondary network achieved up to 22% throughput gain.

Figure 7:
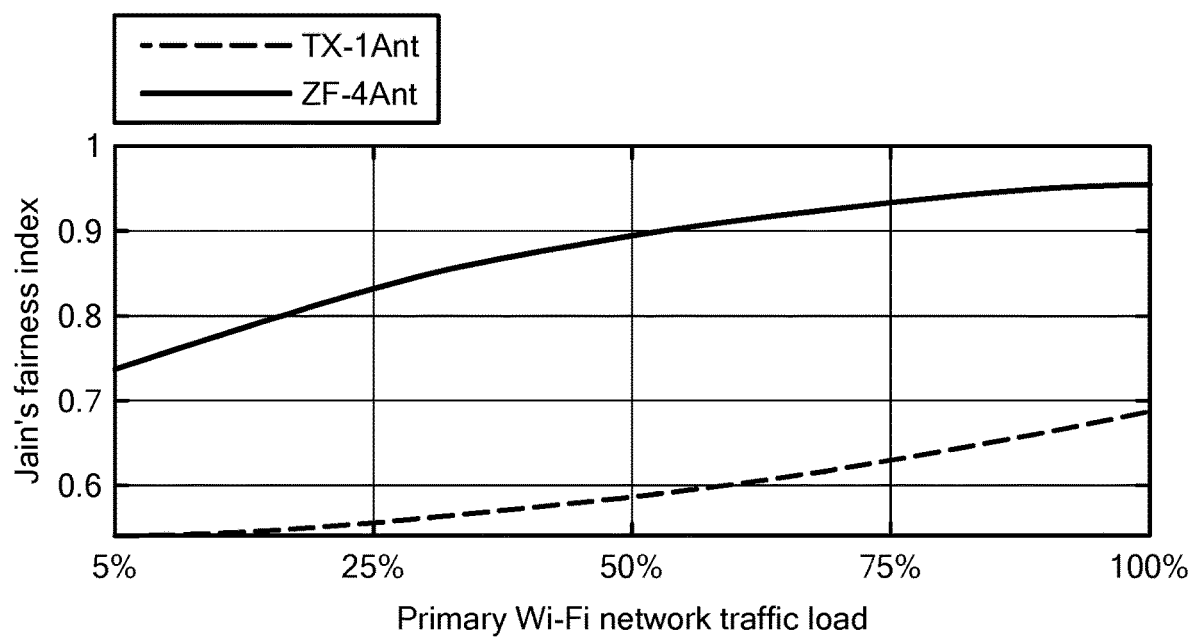
FIG. 7 is a graph of network's Jain's Fairness Index for different beamforming schemes in Scenario 1 of FIG. 4.

Fairness: Here, it was demonstrate that the technology is a spectrum sharing solution that was fair to unlicensed users. When employing ZF-4Ant, the average throughput was 75 packet/s for the primary Wi-Fi network and 230 packet/s for the secondary U-LTE network, with a resulting Jain's fairness index of 0.83 when the primary system is operating at 50% of the load. Higher spectrum efficiency is obtained while guaranteeing lower interference to the primary system with respect to omnidirectional transmission, ensuring desirable fairness level of the overall compound system. Additional results are presented in FIG. 7 by considering different levels of Wi-Fi traffic load in Scenario 1. It can be observed that beamforming-based spectrum sharing always achieved better fairness, which ensures harmonious cross-technology coexistence in the same spectrum bands.

Large scale experiments: In the section above, it was shown how the cognitive beamforming technology scaled with the number of antennas, and the interference levels generated by the different beamforming schemes under consideration were analyzed. Additionally, the compound U-LTE and Wi-Fi network performances of ZF-4Ant and MRT-4Ant were compared against single antenna TX-1Ant spectrum access scheme on larger scale experimental topologies.

In this series of experiments, Arena, a large-scale Radio Frequency SDR-based indoor test grid was employed. Arena features a mix of USRP N2210 and USRP X310 driving a set of antennas hanging off the ceiling of a typical office-like environment in a geometrical 8×8 grid layout, for a total of 64 locations. In these experiments, all the available USRP N210 on Arena were employed, for a total of 16 locations distributed in a 4×4 grid layout (see FIG. 8 or 10). This testing environment represented well typical deployment scenarios of Wi-Fi/Cellular coexisting technologies, both in terms of scale and channel characteristics.

Figure 8:
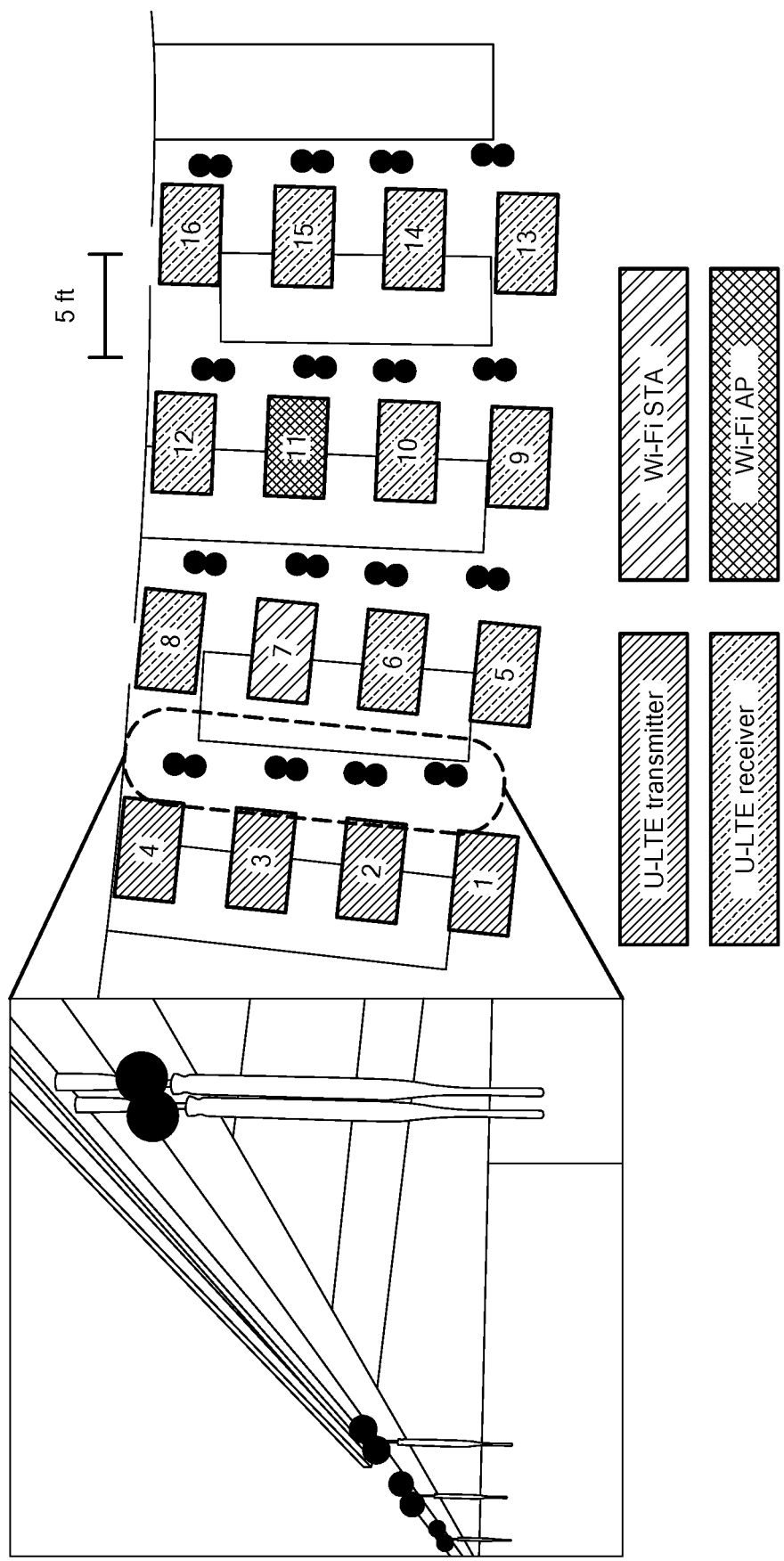
FIG. 8 is an illustration of a second scenario of a network deployment.
Figure 10:
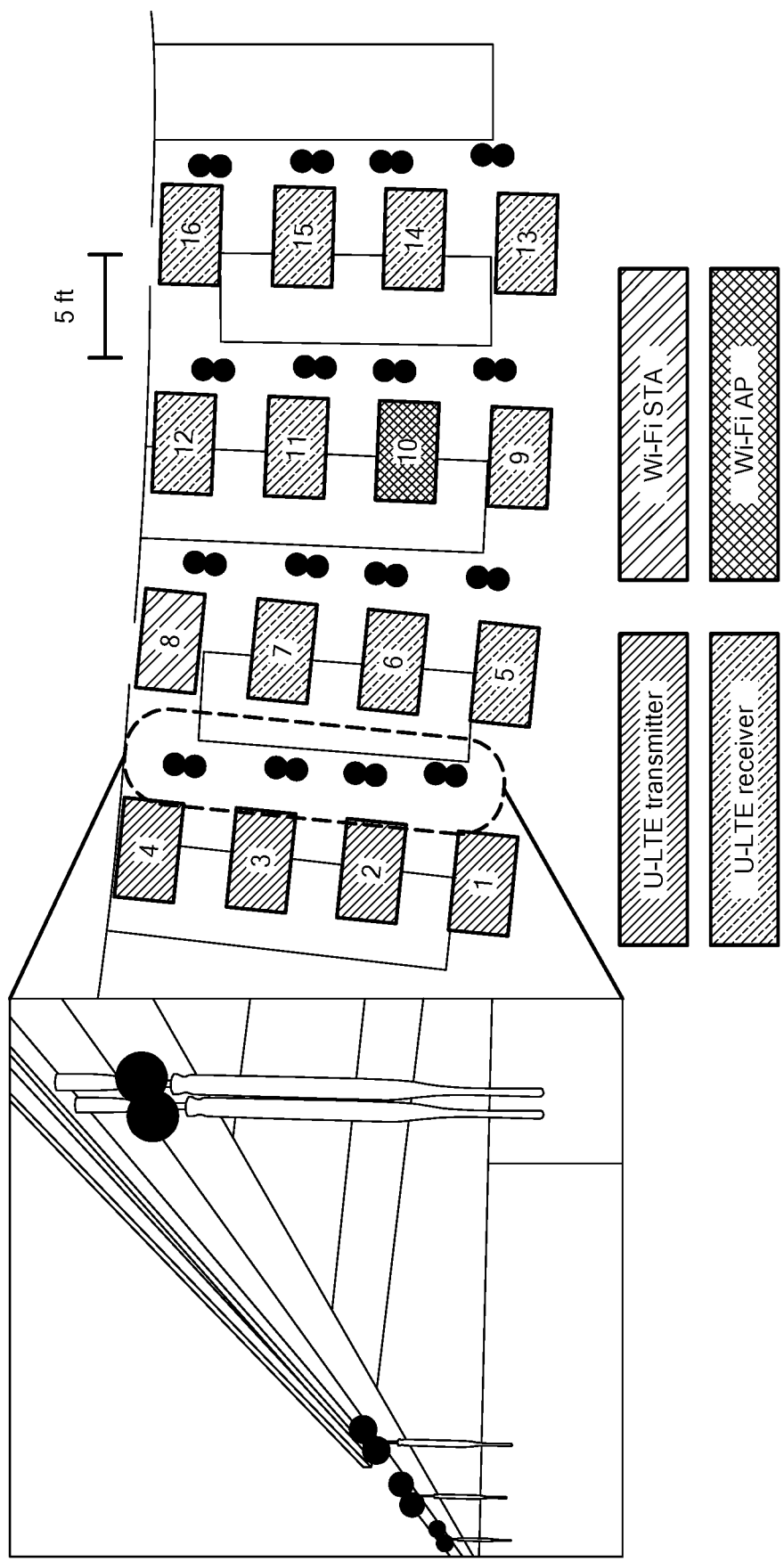
FIG. 10 is an illustration of a third scenario of a network deployment.

Two deployment scenarios are shown in FIG. 8 and FIG. 10 respectively. Scenarios 2 and 3 present a 4-antenna secondary U-LTE transmitter located at the left end side of the testbed (SDRs 1-4) and a primary Wi-Fi users pair, Wi-Fi Access Point (AP) and Wi-Fi Station (STA). The Wi-Fi AP and the Wi-Fi STA were implemented at SDR 11 and SDR 7 in Scenario 2, and at SDR 10 and SDR 8 in and Scenario 3, respectively. In both scenarios, the performance of the beamforming schemes was evaluated for all possible secondary U-LTE receiver locations across the testbed, as illustrated in FIG. 8 and FIG. 10. In these experiments, two coexisting primary and secondary networks were considered, for two different primary network traffic activity patterns, low traffic load (5% of full bandwidth) and high load (100% of full bandwidth), respectively. The performances of the compound network system were evaluated implementing MRT-4Ant beamforming at the U-LTE transmitter when the Wi-Fi traffic activity was low, and adopting ZI-4Ant at U-LTE when the Wi-Fi traffic load was high, respectively.

Figure 9:
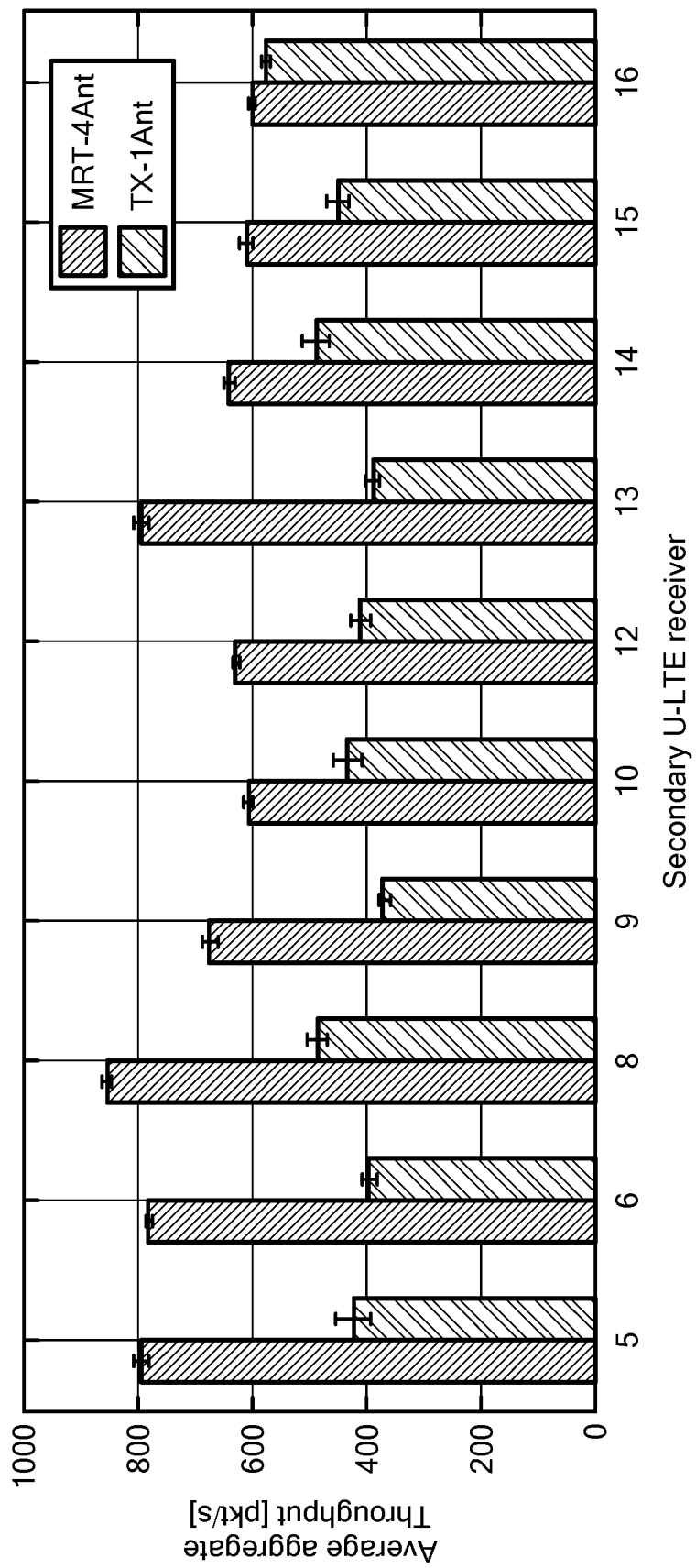
FIG. 9 is a graph of a comparison of MRT beamforming and omnidirectional transmission performances of Scenario 2 of FIG. 8.

Maximum Ratio Transmission Beamforming: In Scenario 2 (see FIG. 8), the performance of MRT-4Ant beamforming scheme compared with TX-1Ant was evaluated for 10 different secondary U-LTE receiver locations for low primary system traffic load. The average aggregate performance of the compound Wi-Fi and U-LTE network is shown for MRT-4Ant and TX-1Ant over ten 1-minute long experiments in FIG. 9, which presents the overall network throughput accounting for both primary and secondary transmissions for 10 different secondary receiver locations. Under MRT-4Ant, the secondary receivers benefitted from favorable distortion-free effective channel conditions, as per (6) in Section III, and higher SINR, as in (9) in Section III. This resulted in improved throughput performance compared to single-antenna omnidirectional transmission schemes. When employing TX-1Ant, the aggregate Wi-Fi and U-LTE network achieved up to 400 more packets per second with respect to MRT-4Ant, with an aggregate average performance gain of 57% over 10 different topologies.

Figure 11:
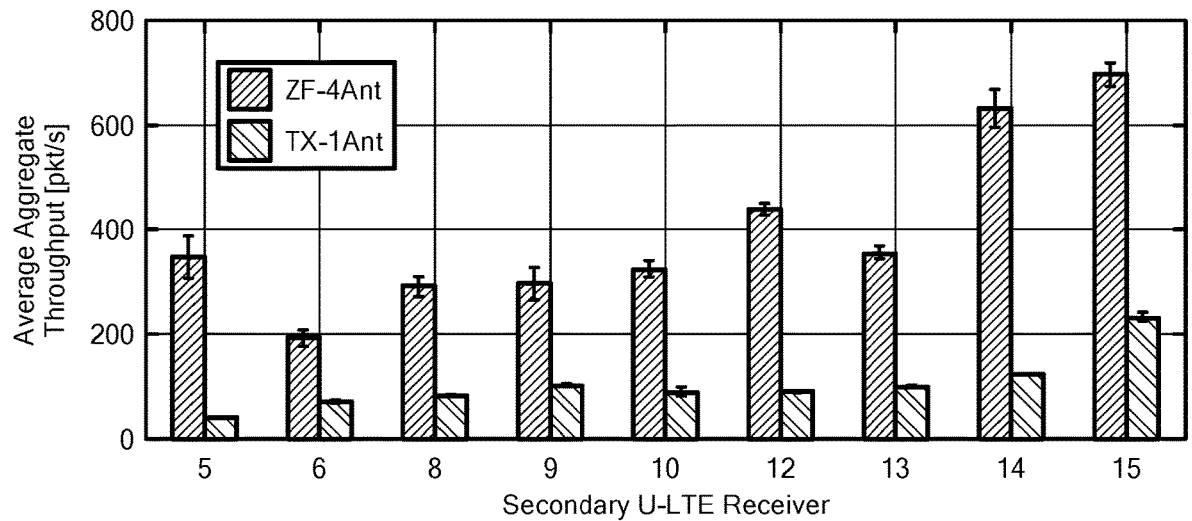
FIG. 11 is a graph of a comparison of zero-forcing beamforming and omnidirectional transmission performances for Scenario 2 of FIG. 8.
Figure 12:
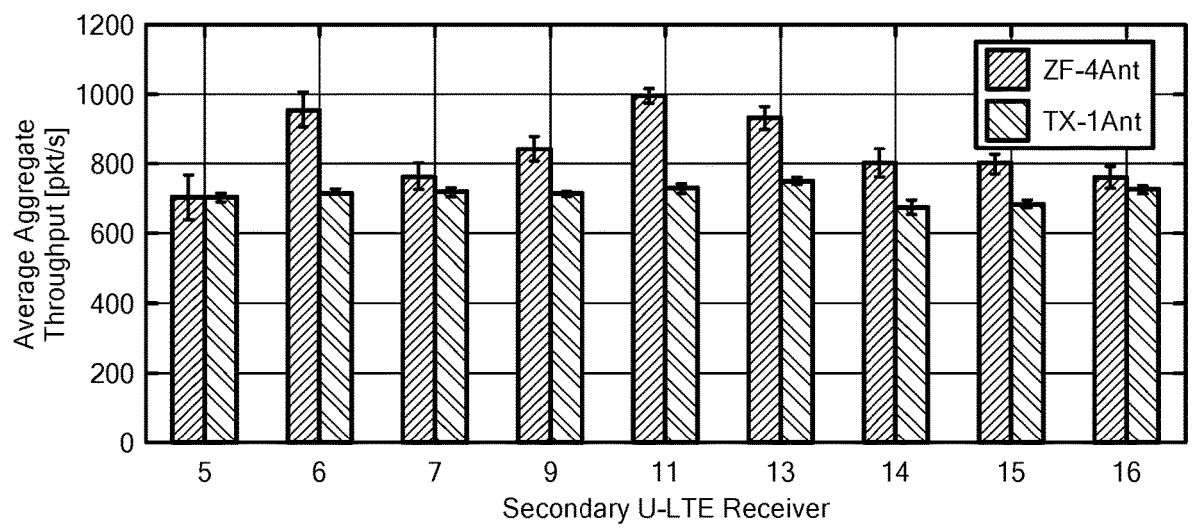
FIG. 12 is a graph of a comparison of zero-forcing beamforming and omnidirectional transmission performances for Scenario 3 of FIG. 10.

Zero-Forcing Beamforming: When the primary system traffic load was high, MRT beamforming failed to achieve good spectrum utilization performance and maintain high network fairness. In such situations, the cognitive beamforming technology can implement zero-forcing beamforming-based transmissions. The performance of zero-forcing beamforming was evaluated against single-antenna omnidirectional transmission in two deployment scenarios, Scenarios 2 and 3 (FIGS. 8 and 10), by varying the location of the secondary U-LTE receiver, for a total of 18 different network topologies. Average aggregate network throughput for over ten 1-minute long experiments are presented in FIG. 11 and FIG. 12, respectively. In both scenarios, and for all the considered topologies, the cognitive beamforming technology was proven to achieve higher aggregate network performance with peak throughput gains of 508 pkt/s in Scenario 2 and 267 pkt/s in Scenario 3; and with a significant overall average performance improvement of 169%.

Mobility: Results presented in FIGS. 9, 11, and 12 can be considered to be representative of mobility emulation. The reported results captured the performance of the cognitive beamforming technology when rapidly switching the secondary U-LTE receiver. The technology continuously computed new beamforming coefficients to match stringent channel coherence timing (roughly 100 ms for sub-6 GHz bands), while human/pedestrian mobility is on a longer time scale, in the order of seconds.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method of sharing a frequency spectrum between a primary wireless network and a secondary wireless network coexisting with the primary wireless network, the method comprising:
   at a node of the secondary wireless network, the node comprising a plurality of antennas, at least one processor including a protocol stack, and memory:
   (a) at the plurality of antennas, receiving incoming signals transmitted on a same frequency band from one or more users of the primary wireless network and from one or more users of the secondary wireless network;
   (b) at a bottom of the protocol stack integrated between the plurality of antennas and upper layers of the protocol stack:
      determining a beamforming scheme and beamforming coefficients for transmission to scheduled users of the secondary wireless network, the beamforming coefficients being determined based on at least three of:
         the selected beamforming scheme,
         extracted channel state information,
         a schedule of secondary users,
         a number of primary users sharing the frequency band, and
         a number of the plurality of antennas; and
      precoding data bit-streams based on the beamforming coefficients for transmission on the plurality of antennas to the scheduled users;
   (c) from the plurality of antennas, transmitting outgoing signals to the scheduled users of the secondary wireless network according to the beamforming scheme; and
   (d) at a physical layer driver at the bottom of the protocol stack in communication with the plurality of antennas, for each antenna:
      on a primary receiver chain, receiving and demodulating the incoming signals from the primary wireless network;
      on a secondary receiver chain, receiving and demodulating the incoming signals from the secondary wireless network; and
      on a transmission chain, precoding outgoing data bit-streams according to the beamforming scheme and modulating the outgoing data bit-streams for transmission from the plurality of antennas to the scheduled users of the secondary wireless network.

2. The method of claim 1, further comprising, in step (b), determining the beamforming scheme to maximize spectrum utilization by users in the primary wireless network and the secondary wireless network and to minimize interference between the primary wireless network and the secondary wireless network and/or between the scheduled users of the secondary wireless network.

3. The method of claim 1, wherein step (b) further comprises, on a cognitive sensing engine at the bottom of the protocol stack, one or more of extracting channel state information of the primary wireless network and the secondary wireless network, analyzing traffic information of the primary wireless network, and detecting interference between the primary wireless network and the secondary wireless network.

4. The method of claim 3, wherein the channel state information includes channel gain information including effects of distance, power decay, path loss, scattering, multipath, small-scale fading, and fast fading.

5. The method of claim 3, wherein the channel state information is estimated from a priori knowledge of transmitted signals or from received signals using a blind or semi-blind channel estimation technique, or a combination thereof.

6. The method of claim 3, wherein detecting interference comprises determining power of received interference and noise at each of the plurality of antennas based on modulation parameters of signals received from the primary wireless network.

7. The method of claim 6, wherein analyzing traffic information includes merging extracted channel state information and average and received power received at each of the plurality of antennas, calculating an estimation of primary user traffic, and determining a performance indicator indicative of network activity surrounding the node.

8. The method of claim 3, wherein analyzing traffic information includes detecting a presence of ongoing traffic of the primary wireless network and determining a traffic activity key performance indicator representative of ongoing primary system traffic, an impact of the primary system traffic on the secondary wireless network, and an impact of the secondary wireless network on the primary wireless network.

9. The method of claim 1, wherein step (b) further comprises, on a beamforming engine at the bottom of the protocol stack passing the beamforming coefficients to a physical layer driver for precoding data bit-streams for transmission on the plurality of antennas to the scheduled users.

10. The method of claim 1, wherein step (b) further comprises selecting the beamforming scheme based on a level of traffic in the primary wireless network and/or the secondary wireless network.

11. The method of claim 1, wherein step (b) further comprises selecting the beamforming scheme from zero forcing beamforming, maximum radio transmit (MRT) beamforming, transmit Wiener precoding, random beamforming, dirty paper coding (DPC), weighted minimum mean squared error (MMSE) precoding, and signal-to-leakage-and-interference ratio (SLNR).

12. The method of claim 1, wherein step (b) further comprises receiving from a scheduling module a schedule of the scheduled users on the secondary wireless network to be served in a time slot.

13. The method of claim 12, wherein the schedule is received from a medium access control layer of the protocol stack.

14. The method of claim 1, wherein the primary wireless network and the secondary wireless network are each operative to transmit with a wireless protocol comprising a WiFi protocol, LTE protocol, or IEEE 802 family protocol.

15. A system for sharing a frequency spectrum between a primary wireless network and a secondary wireless network coexisting with the primary wireless network, comprising:
a node of the secondary wireless network comprising a plurality of antennas, at least one processor, and memory;
the at least one processor including a protocol stack, a bottom of the protocol stack integrated between the plurality of antennas and upper layers of the protocol stack; and
machine-readable instructions stored in the memory, that upon execution by the at least one processor cause the system to carry out operations at the bottom of the protocol stack comprising:
(a) on a receiver path at the bottom of the protocol stack in communication with the plurality of antennas, receiving incoming signals transmitted on a same frequency band from one or more users of the primary wireless network and from one or more users of the secondary wireless network;
(b) determining a beamforming scheme and beamforming coefficients for transmission to scheduled users of the secondary wireless network, the beamforming coefficients being determined based on at least three of:
the selected beamforming scheme,
extracted channel state information,
a schedule of secondary users,
a number of primary users sharing the frequency band, and
a number of the plurality of antennas; and
precoding data bit-streams based on the beamforming coefficients for transmission on the plurality of antennas to the scheduled users;
(c) on a transmission path at the bottom of the protocol stack to the plurality of antennas, transmitting outgoing signals to the scheduled users of the secondary network according to the beamforming scheme;
wherein the at least one processor includes a physical layer driver at the bottom of the protocol stack in communication with the plurality of antennas, comprising, for each antenna:
a primary receiver chain operative to receive and demodulate incoming signals from the primary wireless network;
a secondary receiver chain operative to receive and demodulate incoming signals from the secondary wireless network; and
a transmission chain operative to precode outgoing data bit-streams according to the beam forming scheme and modulate the outgoing data bit-streams for transmission from the plurality of antennas to the scheduled users of the secondary wireless network.

16. The system of claim 15, wherein the at least one processor includes a cognitive sensing engine at the bottom of the protocol stack comprising one or more of:
a channel state information extraction module operative to extract channel state information of the primary wireless network and the secondary wireless network;
a traffic analyzer module operative to analyze traffic by users of the primary wireless network; and
an interference detector module operative to detect interference between the primary wireless network and the secondary wireless network.

17. The system of claim 15, wherein the at least one processor includes a beamforming engine at the bottom of the protocol stack operative to pass the beamforming coefficients to a physical layer driver for precoding data bitstreams for transmission on the plurality of antennas to the scheduled users.

\* \* \* \* \*